(12) United States Patent
Ozawa

(10) Patent No.: US 10,423,825 B2
(45) Date of Patent: Sep. 24, 2019

(54) RETRIEVAL DEVICE, RETRIEVAL METHOD, AND COMPUTER-READABLE STORAGE MEDIUM FOR COMPUTER PROGRAM

(71) Applicant: KONICA MINOLTA, INC., Chiyoda-ku, Tokyo (JP)

(72) Inventor: Kaitaku Ozawa, Nishinomiya (JP)

(73) Assignee: KONICA MINOLTA, INC., Tokyo (JP)

( * ) Notice: Subject to any disclaimer, the term of this patent is extended or adjusted under 35 U.S.C. 154(b) by 306 days.

(21) Appl. No.: 15/188,846

(22) Filed: Jun. 21, 2016

(65) Prior Publication Data

US 2017/0004147 A1    Jan. 5, 2017

(30) Foreign Application Priority Data

Jul. 3, 2015 (JP) ................. 2015-134215

(51) Int. Cl.
*G06K 9/00* (2006.01)
*H04N 1/21* (2006.01)
(Continued)

(52) U.S. Cl.
CPC ..... *G06K 9/00442* (2013.01); *G06F 16/9554* (2019.01); *H04N 1/00244* (2013.01); *H04N 1/2191* (2013.01)

(58) Field of Classification Search
CPC .......... G06K 9/00442; G06F 17/30876; G06F 17/30879; G06F 17/30997; G06F 17/30
(Continued)

(56) References Cited

U.S. PATENT DOCUMENTS 6,631,495 B2 * 10/2003 Kato ................. G06F 16/40 715/255
7,391,917 B2    6/2008 Ohta et al.
(Continued)

FOREIGN PATENT DOCUMENTS

CN    1607541 A    4/2005
JP    11003352 A    1/1999
(Continued)

OTHER PUBLICATIONS

Japanese Office Action dated Sep. 5, 2017 issued in counterpart Japanese Application No. 2015-134215.
(Continued)

*Primary Examiner* — Jamares Q Washington
(74) *Attorney, Agent, or Firm* — Holtz, Holtz & Volek PC

(57) ABSTRACT

A retrieval device includes: a printer configured to print a document onto paper together with an identifier image, the identifier image representing an identifier of the document; a storage configured to correlate electronic data for the document with the identifier to store the electronic data; an image taking device configured to photograph the identifier image in the paper; an input device configured to receive an input of a keyword; a search portion configured to search for the keyword in the document by using the electronic data corresponding to the identifier represented in the identifier image photographed; and a display device configured to display a result of the search made by the search portion.

15 Claims, 19 Drawing Sheets

(51) Int. Cl.
H04N 1/00 (2006.01)
G06F 16/955 (2019.01)

(58) Field of Classification Search
USPC ............................... 358/1.9, 3.28, 1.15, 403
See application file for complete search history.

(56) References Cited

U.S. PATENT DOCUMENTS

2004/0223197 A1* 11/2004 Ohta .................. G06K 9/00456
358/538
2008/0168110 A1* 7/2008 Hagiwara ............. G06F 3/1208
2015/0205876 A1* 7/2015 Blume ............. G06F 17/30887
707/708

FOREIGN PATENT DOCUMENTS

| JP | 2005258933 A | 9/2005 |
| JP | 2007025980 A | 2/2007 |
| JP | 2009088876 A | 4/2009 |
| JP | 2011120144 A | 6/2011 |

OTHER PUBLICATIONS

Chinese Office Action (and English language translation thereof) dated Jan. 29, 2019 issued in counterpart Chinese Application No. 201610515574.1.

* cited by examiner

FIG. 13

| DOCUMENT IDENTIFIER | PAGE NUMBER | DOCUMENT FILE |
|---|---|---|
| S101 | 5<br>7 | 📄 —65 |
| S201 | 1<br>2<br>3 | 📄 —65 |
| ⋮ | ⋮ | ⋮ |

203

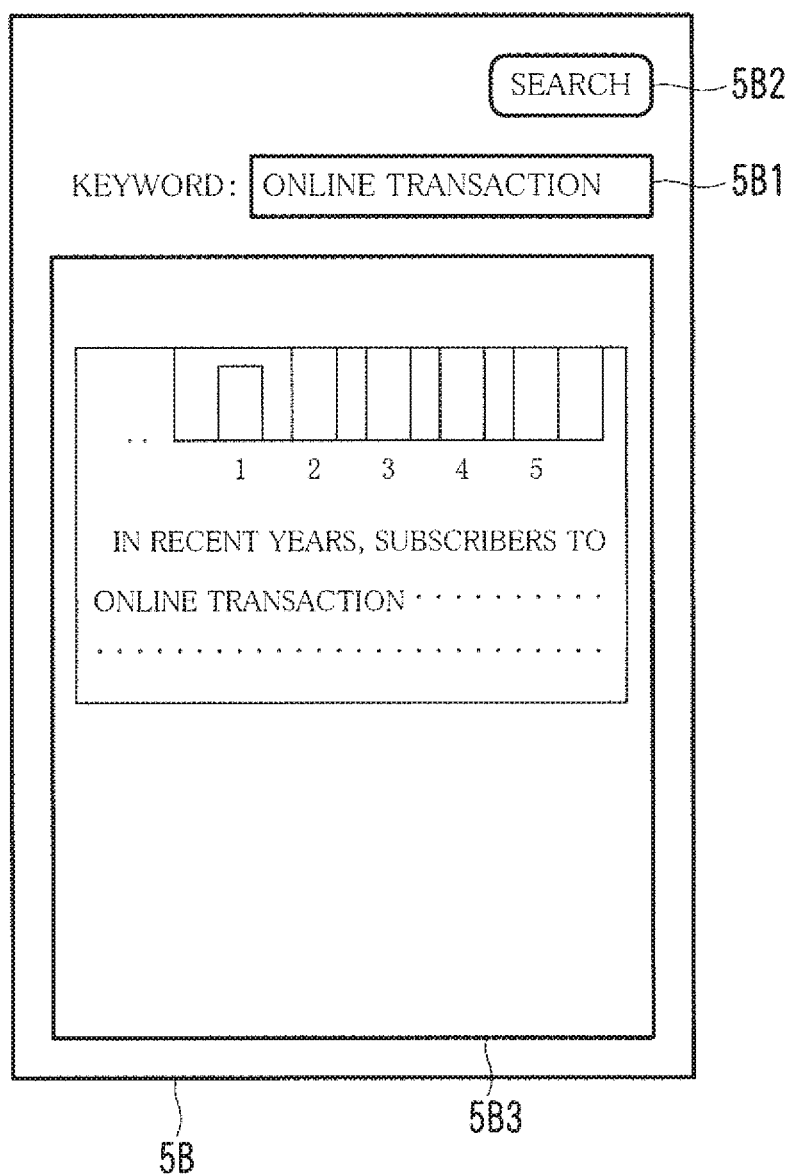

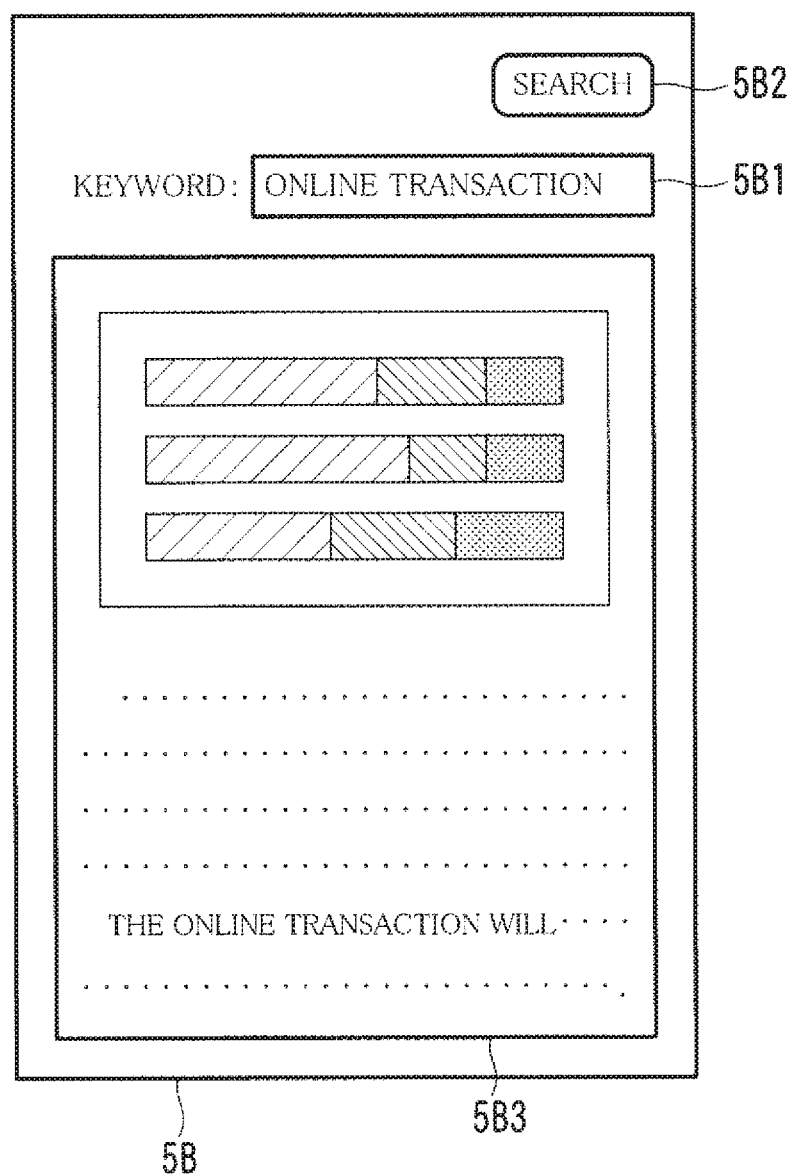

RETRIEVAL DEVICE, RETRIEVAL METHOD, AND COMPUTER-READABLE STORAGE MEDIUM FOR COMPUTER PROGRAM

This application is based on Japanese patent application No. 2015-134215 filed on Jul. 3, 2015, the contents of which are hereby incorporated by reference.

BACKGROUND OF THE INVENTION

1. Field of the Invention

The present invention relates to a technology for searching for a keyword from a document.

2. Description of the Related Art

In recent years, greatly reducing the use of paper, namely, going paperless, has become popular. Nevertheless, documents are still printed onto paper in many cases. This is because a paper document convenient for a user. The paper document allows the user to, for example, take a note freely thereon or to put sheets of the document on a desk to read the document.

On the other hand, using electronic data of a document with a computer is also convenient. In particular, in searching for a specific keyword from a document having many pages, the computer is capable searching for the keyword quickly and easily.

In the meantime, there have been proposed the technologies discussed below. According to one technology, a center has a number issuing system, a number issuing information database, a file collection system, a bar code OCR system, and a file database. A personal computer and a digital composite machine disposed on a network are connected to the file collection system and the file database. When title information of the document is inputted from the personal computer, the number issuing system issues the bar code number according to a document type and records it into the number issuing information database, the personal computer converts the bar code number issued by the number issuing system into a bar code, and the digital composite machine takes in the bar code from the personal computer, prints a cover with the bar code, reads the document attached with the cover, and stores it into a confidential box as an image file (Japanese Laid-open Patent Publication No. 2005-258933).

According to another technology, when a document created by a client PC is printed out or sent via e-mail, or, when a hard copy of a printed document is inputted by, for example, an image scanner or received via e-mail, an identification code unique to the document is automatically added to the document and then is transferred to a document registration server. In another case, when a document registered in the document registration server is searched or retrieved to use or apply processing on the document, an image of the identification code of the hard copy of the printed document is inputted, so that a desired document is obtained (Japanese Laid-open Patent Publication No. 11-3352).

The foregoing retrieval technologies make it possible to retrieve a desired document from a huge amount of documents by entering a bar code number or an identification code.

It is desirable, however, to search for a keyword from a document printed on paper more easily than is conventionally possible.

SUMMARY

The present invention has been achieved in light of such an issue, and an object thereof is to search for a keyword from a document printed on paper more easily than is conventionally possible.

According to one aspect of the present invention, a retrieval device includes: a printer configured to print a document onto paper together with an identifier image, the identifier image representing an identifier of the document; a storage configured to correlate electronic data for the document with the identifier to store the electronic data; an image taking device configured to photograph the identifier image in the paper; an input device configured to receive an input of a keyword; a search portion configured to search for the keyword in the document by using the electronic data corresponding to the identifier represented in the identifier image photographed; and a display device configured to display a result of the search made by the search portion.

These and other characteristics and objects of the present invention will become more apparent by the following descriptions of preferred embodiments with reference to drawings.

BRIEF DESCRIPTION OF THE DRAWINGS

FIG. 13 is a diagram showing an example as to how a document file is stored in a document file storage portion.

FIGS. 17A and 17B are diagrams showing an example of a search screen.

DESCRIPTION OF THE PREFERRED EMBODIMENTS

Figure 1:
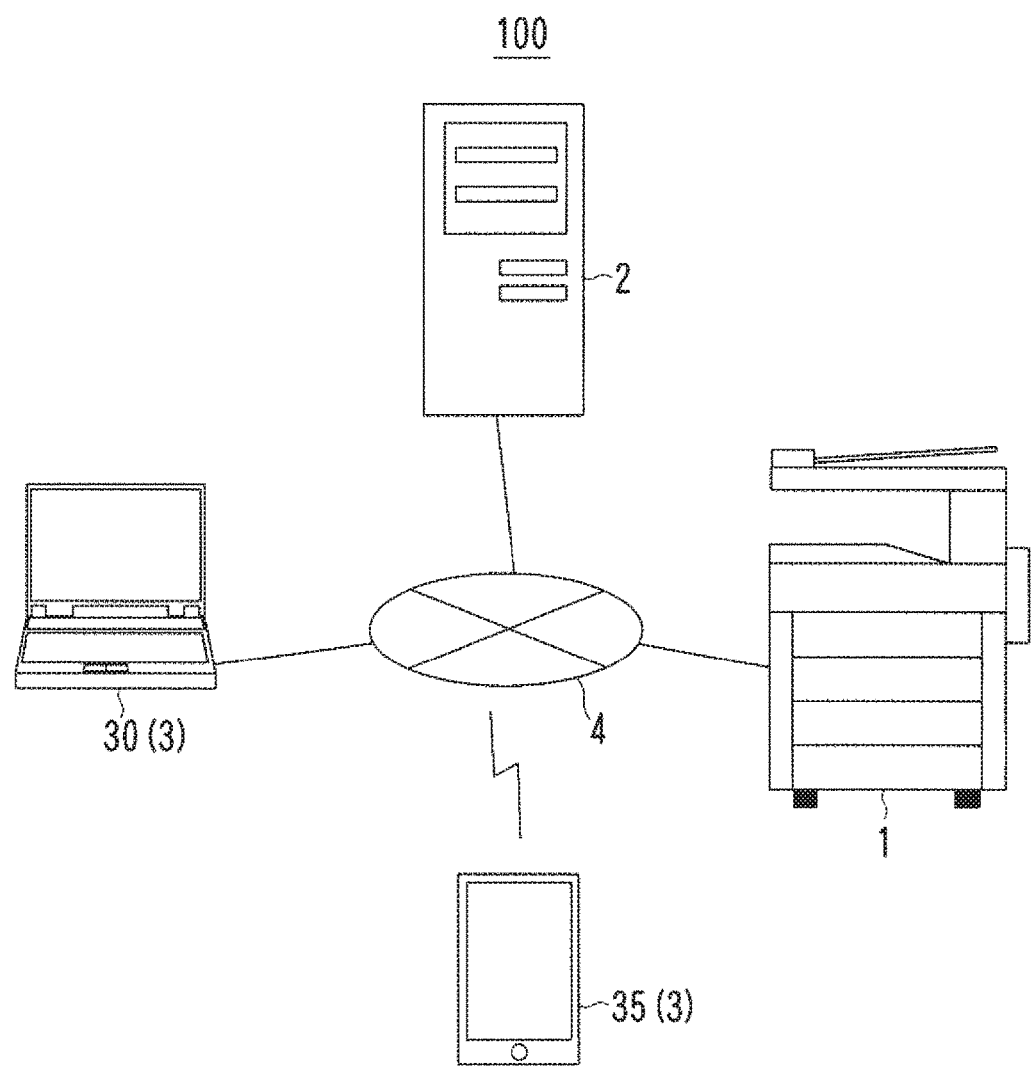
FIG. 1 is a diagram showing an example of the overall configuration of a document management system.

FIG. 1 is a diagram showing an example of the overall configuration of a document management system 100. FIG.

Figure 3:
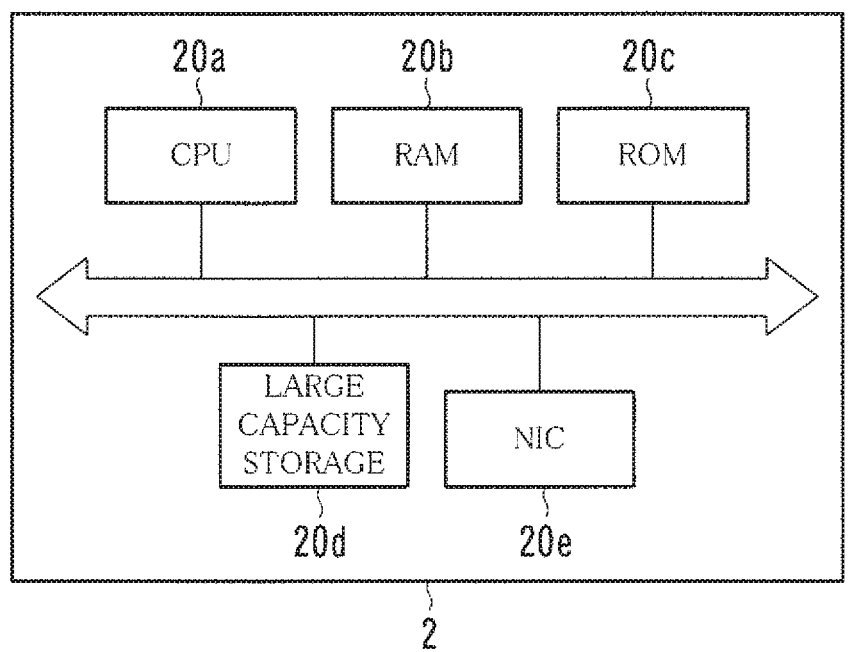
FIG. 3 is a diagram showing an example of the hardware configuration of a document server.
Figure 4:
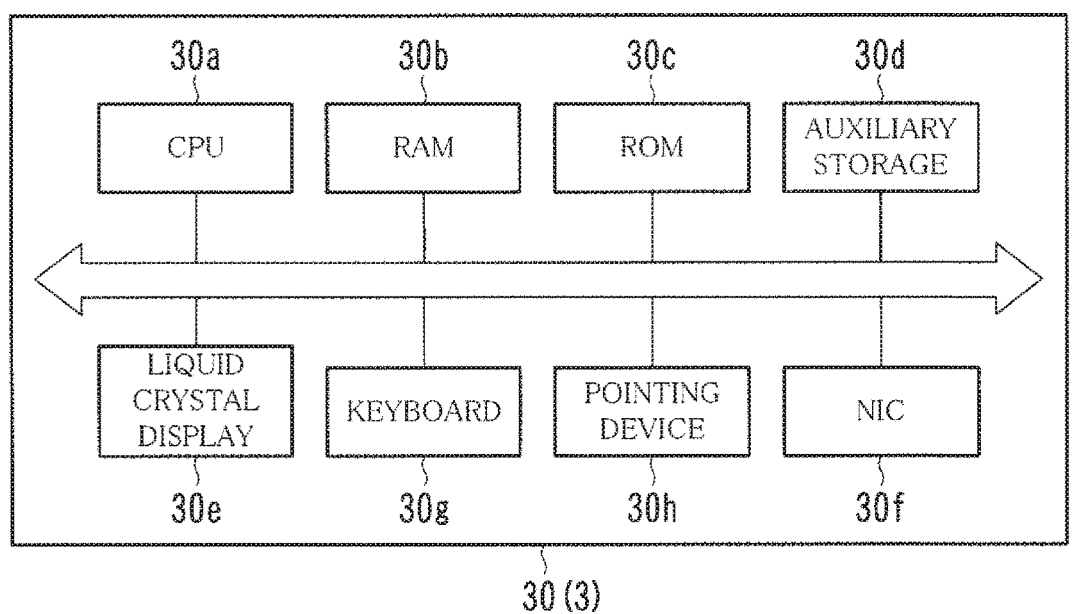
FIG. 4 is a diagram showing an example of the hardware configuration of a terminal.
Figure 5:
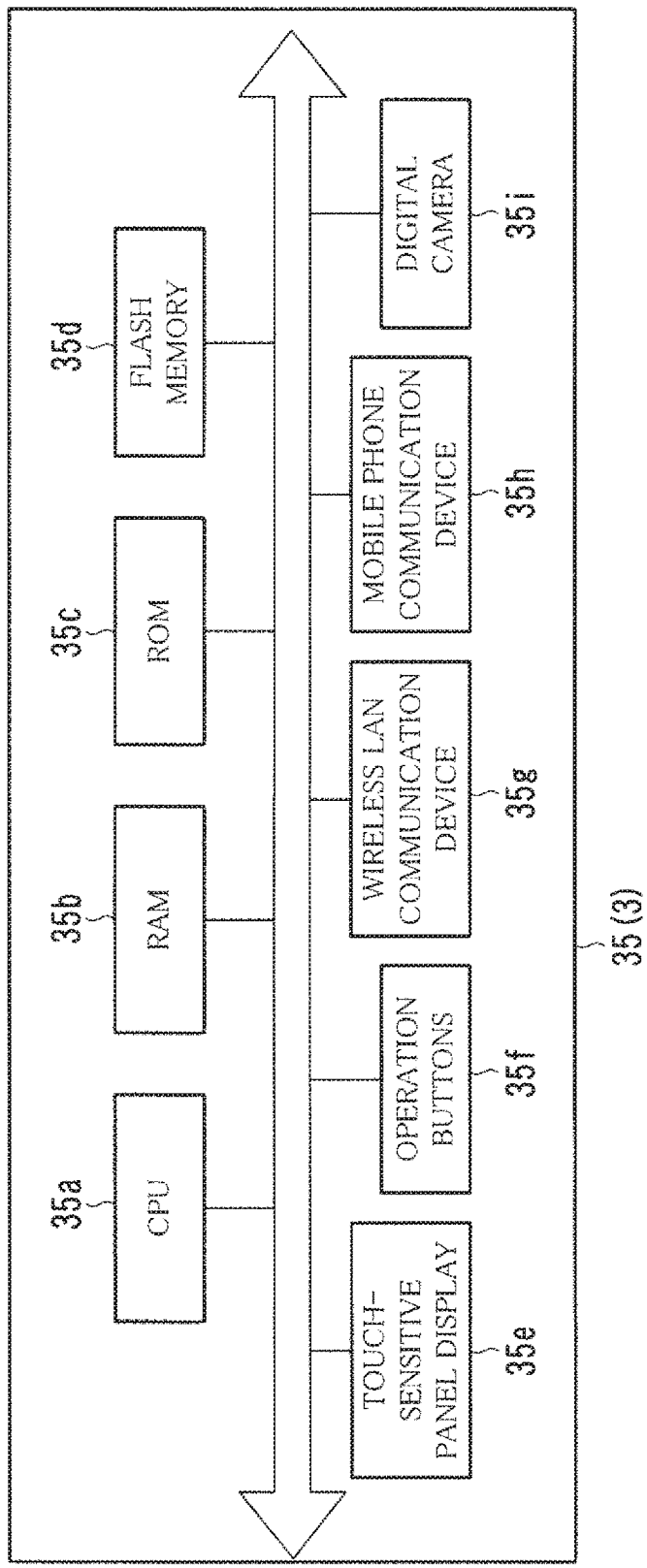
FIG. 5 is a diagram showing an example of the hardware configuration of a terminal.

2 is a diagram showing an example of the hardware configuration of an image forming apparatus 1. FIG. 3 is a diagram showing an example of the hardware configuration of a document server 2. FIG. 4 is a diagram showing an example of the hardware configuration of a terminal 30. FIG. 5 is a diagram showing an example of the hardware configuration of a terminal 35.

As shown in FIG. 1, the document management system 100 is configured of the image forming apparatus 1, the document server 2, a plurality of terminals 3, a communication line 4, and so on.

The document management system 100 enables a user to print a document onto paper. The document management system 100 also enables the user to search a keyword from the printed document.

The image forming apparatus 1, the document server 2, and the individual terminals 3 are configured to perform communication with one another via the communication line 4. Examples of the communication line 4 are a Local Area Network (LAN), the Internet, a land-line telephone network, and a mobile phone network.

The image forming apparatus 1 is an apparatus into which functions such as copying, network printing, faxing, and scanning are consolidated. The image forming apparatus 1 is generally called a "multifunction device" or a "Multi-Functional Peripheral (MFP)".

Figure 2:
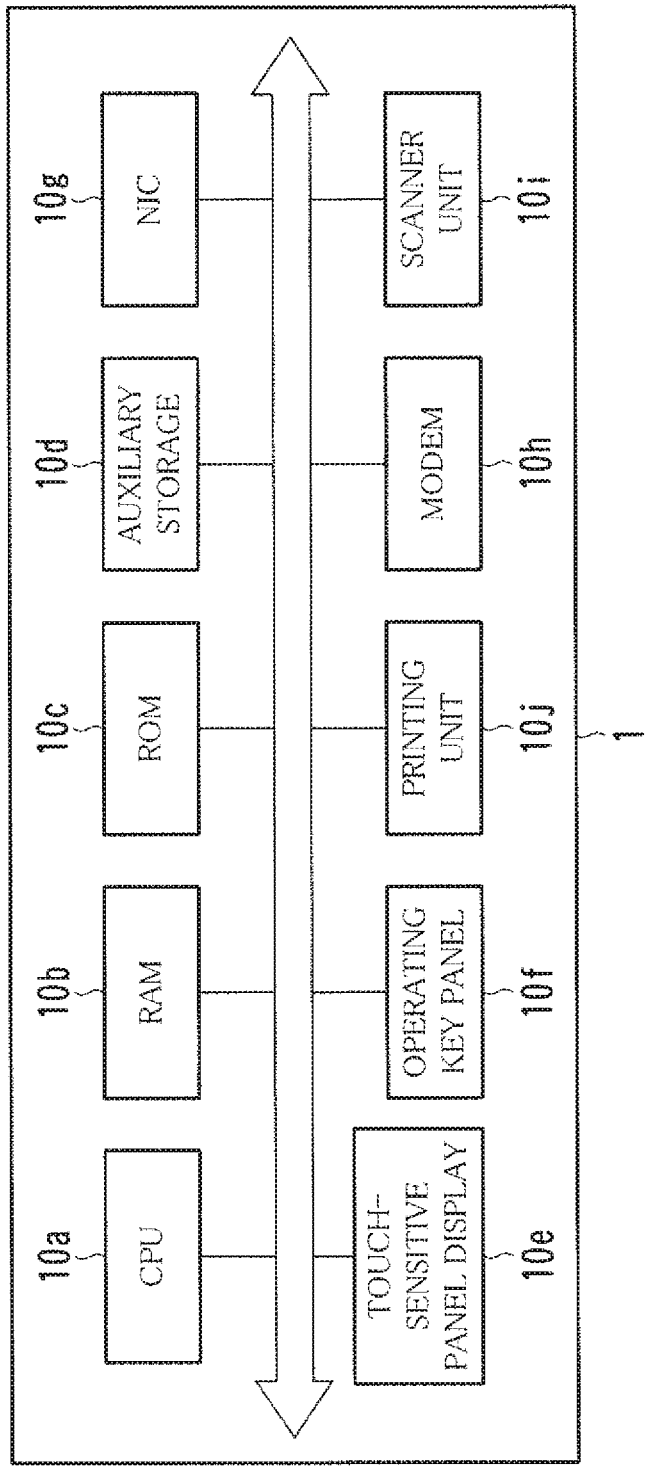
FIG. 2 is a diagram showing an example of the hardware configuration of an image forming apparatus.

Referring to FIG. 2, the image forming apparatus 1 is configured of a Central Processing Unit (CPU) 10a, a Random Access Memory (RAN) 10b, a Read Only Memory (ROM) 10c, an auxiliary storage 10d, a touch-sensitive panel display 10e, an operating key panel 10f, a Network Interface Card (NIC) 10g, a modem 10h, a scanner unit 10i, a printing unit 10j, and so on.

The touch-sensitive panel display 10e displays, for example, a screen for presenting messages to the user, a screen for allowing the user to enter commands or information, and a screen for showing the results of processing executed by the CPU 10a. The touch-sensitive panel display 10e sends to the CPU 10a a signal indicating the touched position.

The operating key panel 10f is a so-called hardware keyboard. The operating key panel 10f includes numeric keys, a start key, a stop key, and a function key.

The NIC log performs communication with the document server 2 and the terminals 3 in accordance with protocol such as Transmission Control Protocol/Internet Protocol (TCP/IP).

The modem 10h performs communication with a facsimile terminal in accordance with a protocol such as G3.

The scanner unit 10i optically reads an image recorded on a sheet of paper placed onto a platen glass, and generates image data thereof.

The printing unit 10j prints the image captured by the scanner unit 10i. The printing unit 10j also performs network printing. To be specific, the printing unit 10j prints an image onto paper based on data sent from a personal computer or the like and received by the NIC 10g. The printing unit 10j also prints an image onto paper based on data sent from a facsimile terminal and received by the modem 10h.

The ROM 10c or the auxiliary storage 10d stores, therein, a program for implementing the functions such as copying and network printing. The ROM 10c or the auxiliary storage 10d also stores, therein, a document file registration program 10P. The document file registration program 10P is to register a file of a document printed by the printing unit 10j into the document server 2.

The programs are loaded into the RAM lab as necessary, and are executed by the CPU 10a. The auxiliary storage 10d is, for example, a hard disk drive or a Solid State Drive (SSD).

The document server 2 centrally manages files of documents printed by the printing unit 10j. The document server 2 also searches for a keyword from a document and offers the search result.

Referring to FIG. 3, the document server 2 is configured of a CPU 20a, a RAM 20b, a ROM 20c, a large capacity storage 20d, an NIC 20e, and so on.

The NIC 20e performs communication with the image forming apparatus 1 and the terminals 3 in accordance with a protocol such as TCP/IP.

The large capacity storage 20d stores a document management program 20P therein. The document management program 20P is to manage files of documents printed by the image forming apparatus 1 and to search for a keyword from the documents.

The document management program 20P is loaded into the RAM 20b and executed by the CPU 20a. The large capacity storage 20d is, for example, a hard disk drive or an SSD.

Each of the terminals 3 is a client for the user to use the various functions of the image forming apparatus 1. The terminal 3 is used by the user, in particular, to use the network printing function. The terminal 3 is also used to cause the document server 2 to perform processing for searching for a keyword from a document printed by the image forming apparatus 1.

Examples of the terminal 3 include a personal computer, a smartphone, and a tablet computer.

The description goes on to an example where the terminal 30, which is a personal computer, is used as the terminal 3 for using the network printing function, and the terminal 35, which is a smartphone, is used as the terminal 3 for causing the document server 2 to perform the processing for searching for a keyword.

Referring to FIG. 4, the terminal 30 is configured of a CPU 30a, a RAM 30b, a ROM 30c, an auxiliary storage 30d, a liquid crystal display 30e, an NIC 30f, a keyboard 30g, a pointing device 30h, and so on.

The liquid crystal display 30e displays, for example, a screen showing a document to be printed and a screen for entering a print command.

The NIC 30f performs communication with the image forming apparatus 1 in accordance with a protocol such as TCP/IP. The keyboard 30g and the pointing device 30h are input devices for the user to enter information and a command.

The ROM 30c or the auxiliary storage 30d stores, therein, an operating system, different application programs, and a printer driver 30P. The printer driver 30P is a program to cause the image forming apparatus 1 to execute network printing and to send to the image forming apparatus 1 a document file to be registered to the document server 2.

The programs are loaded into the RAM 30b as necessary and executed by the CPU 30a.

Referring to FIG. 5, the terminal 35 is configured of a CPU 35a, a RAM 35b, a ROM 35c, a flash memory 35d, a touch-sensitive panel display 35e, operation buttons 35f, a wireless LAN communication device 35g, a mobile phone communication device 35h, a digital camera 35i, and so on.

The touch-sensitive panel display 35e displays, for example, a screen for allowing the user to enter a keyword for search and a screen for showing the search results. The touch-sensitive panel display 35*e* sends to the CPU 35*a* a signal indicating the touched position.

The operation buttons 35*f* include a so-called home button and a sound volume button. The operation buttons 35*f* are used for the user to enter a command to take an image of a Quick Response (QR) code (registered trademark), and so on.

The wireless LAN communication device 35*g* establishes a connection with a base station of the LAN implementing the communication line 4. The wireless LAN communication device 35*g* then performs communication with the image forming apparatus 1 and the document server 2 in accordance with a protocol such as TCP/IP.

The mobile phone communication device 35*h* establishes a connection with a base station of the mobile phone network implementing the communication line 4. The mobile phone communication device 35*h* then performs communication with the image forming apparatus 1 and the document server 2 in accordance with a protocol such TCP/IP.

The digital camera 35*i* photographs an image to generate image data thereof. In this embodiment, the digital camera 35*i* is used to, in particular, photograph a QR code.

The ROM 35*c* or the flash memory 35*d* stores, therein, an operating system, different application programs, and a search program 35P. The search program 35P is to cause the document server 2 to search for a keyword.

The programs are loaded into the RAM 35*b* as necessary and executed by the CPU 35*a*.

Figure 6:
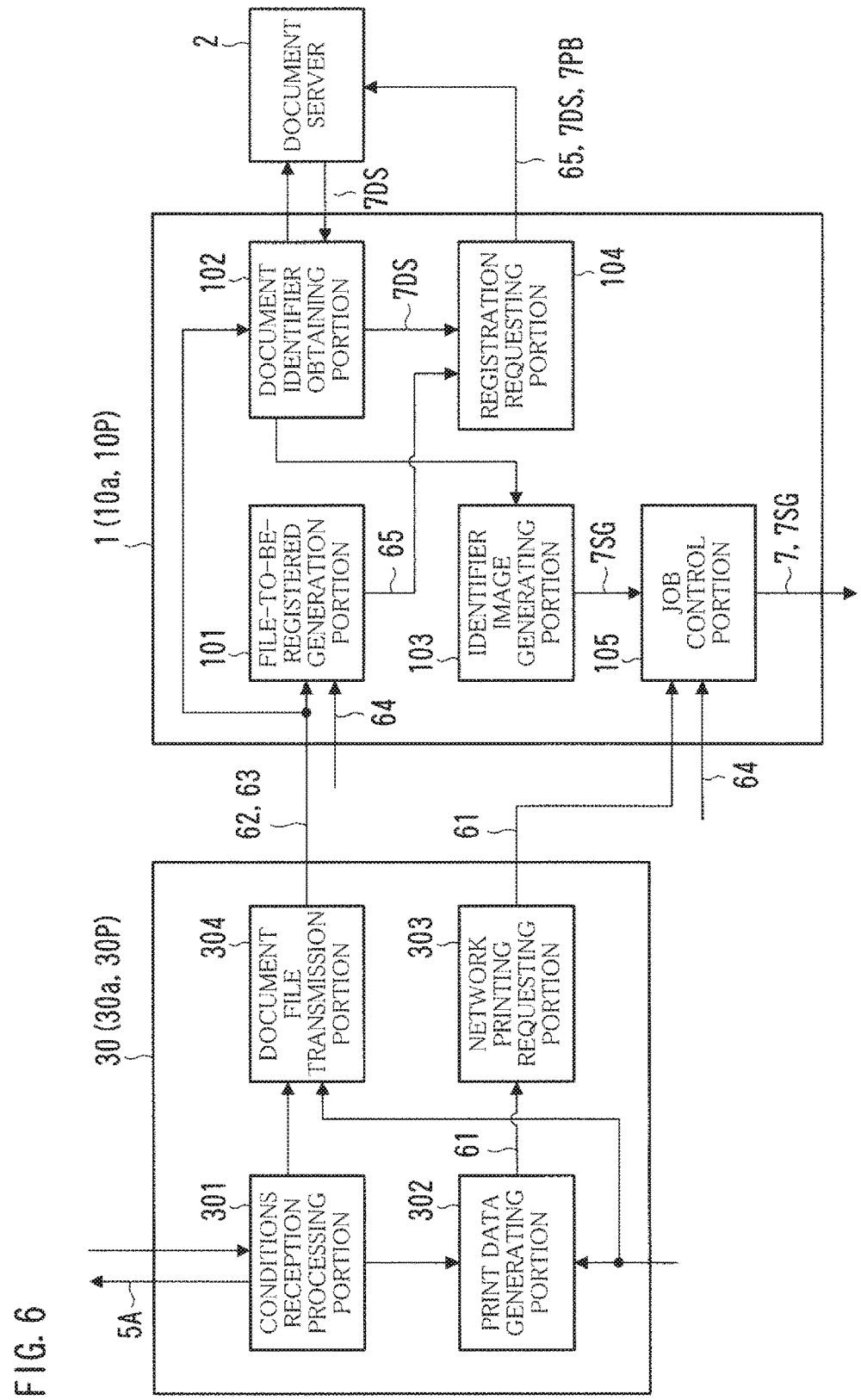
FIG. 6 is a diagram showing an example of the functional configuration of an image forming apparatus and the functional configuration of a terminal.
Figure 7:
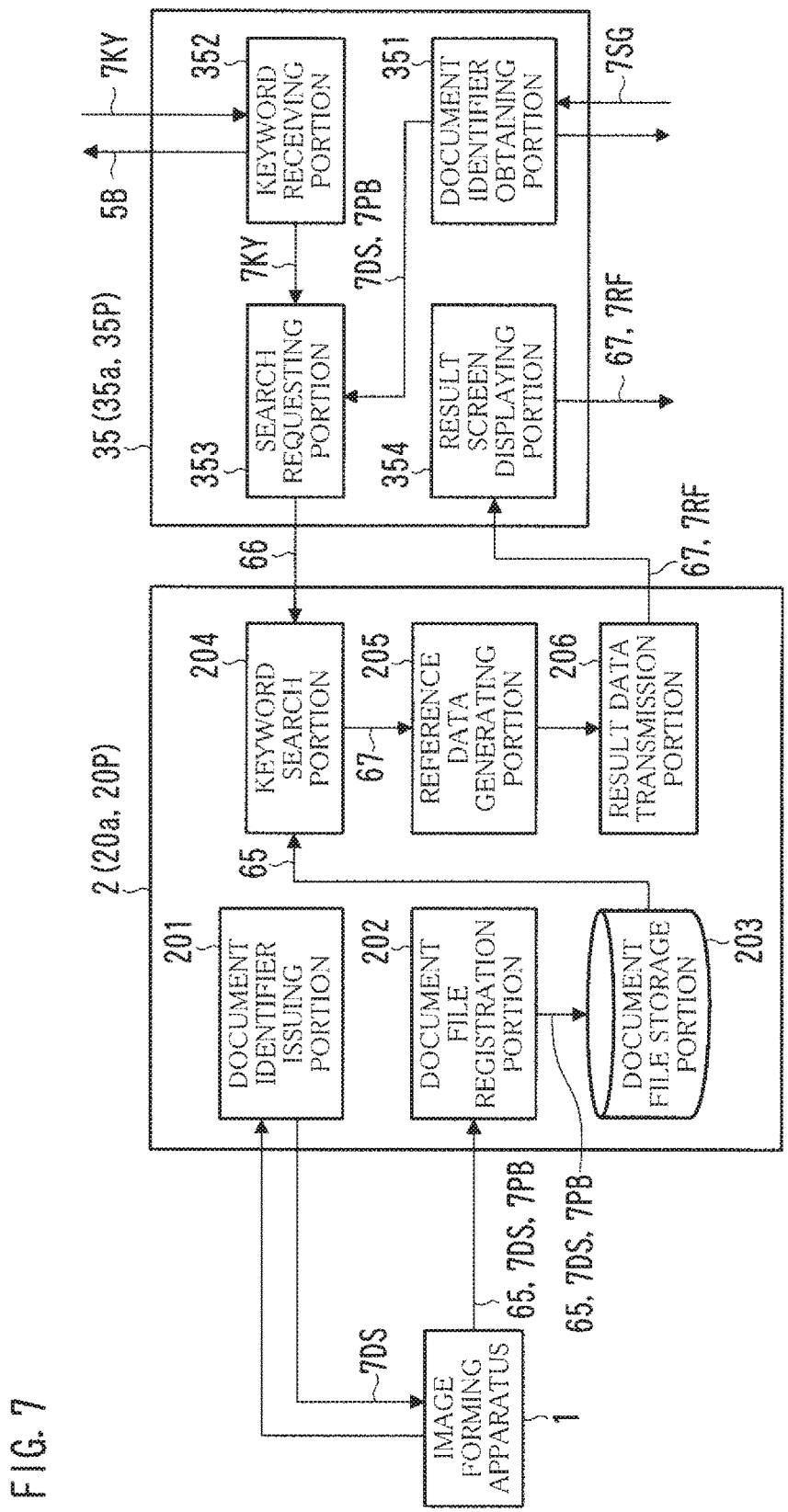
FIG. 7 is a diagram showing an example of the functional configuration of a document server and the functional configuration of a terminal.
Figure 8:
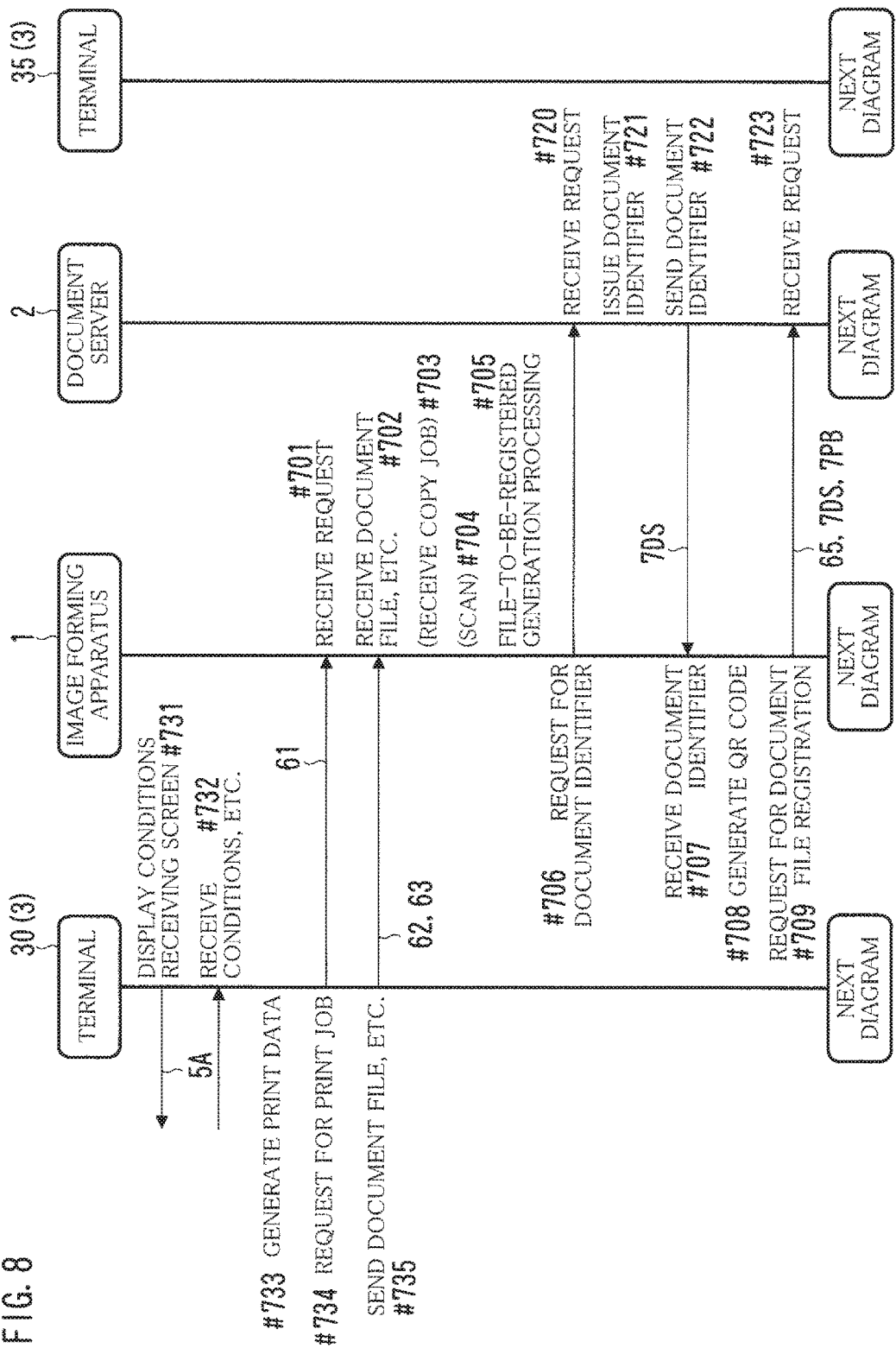
FIG. 8 is a sequence diagram showing an example of the flow of processing by an image forming apparatus, a document server, a terminal, and another terminal.
Figure 9:
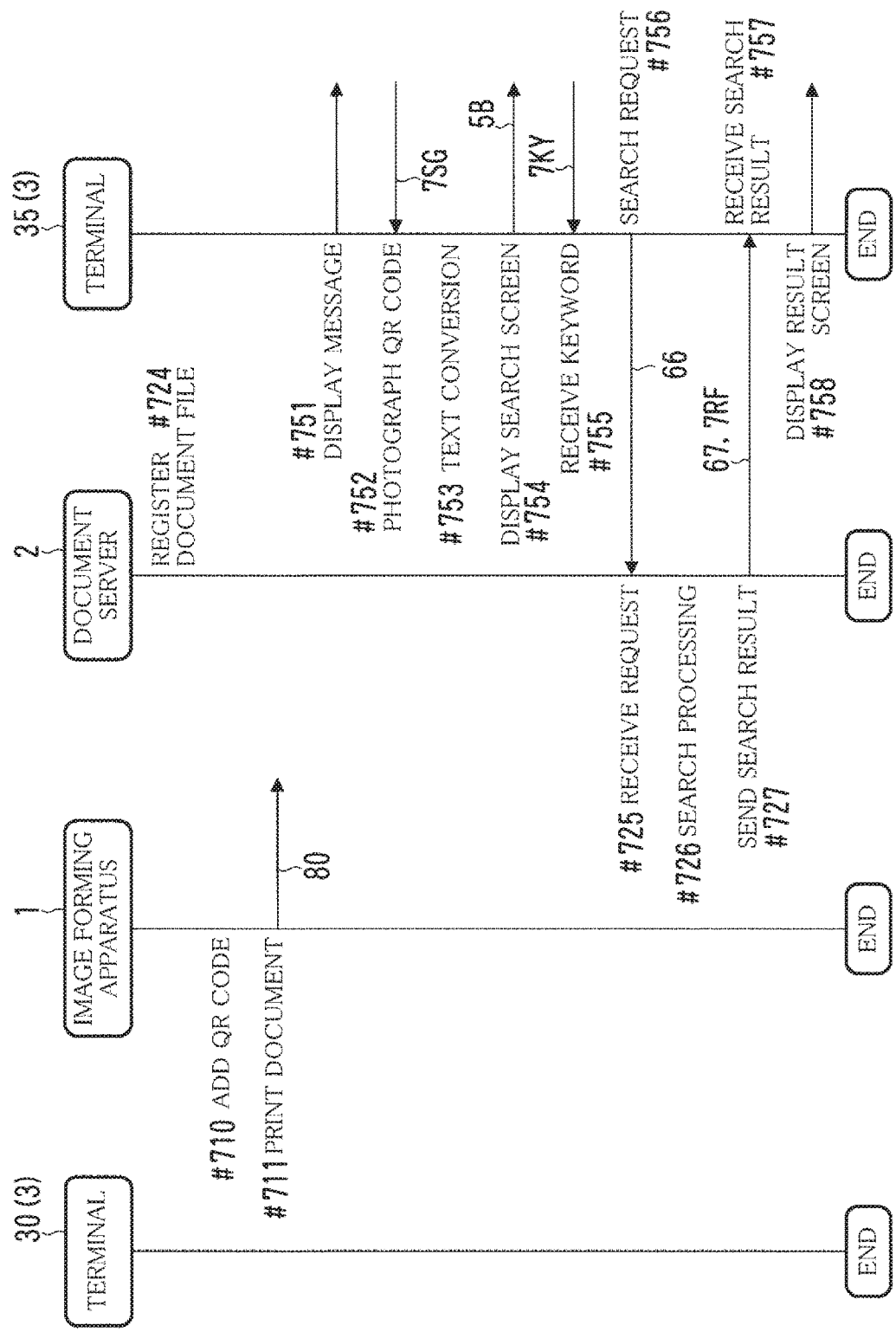
FIG. 9 is a sequence diagram showing an example of the flow of processing by an image forming apparatus, a document server, a terminal, and another terminal.
Figure 10:
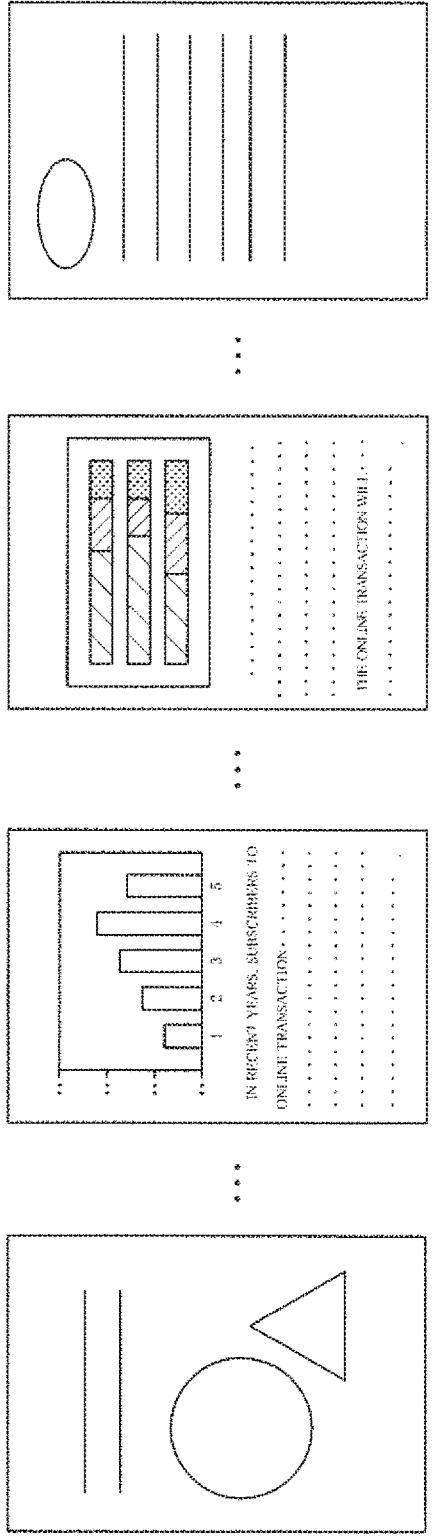
FIG. 10 is a diagram showing an example of a document.
Figure 11:
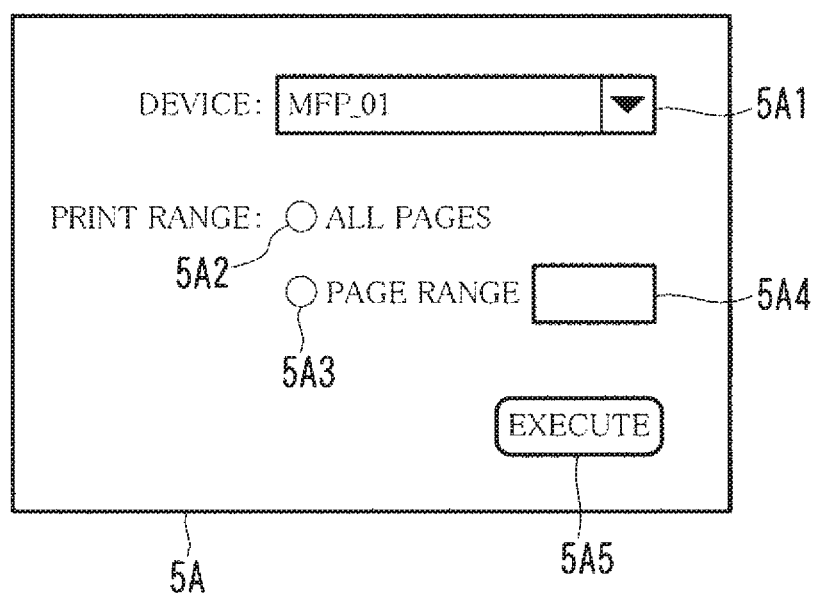
FIG. 11 is a diagram showing an example of a conditions receiving screen.
Figure 12:
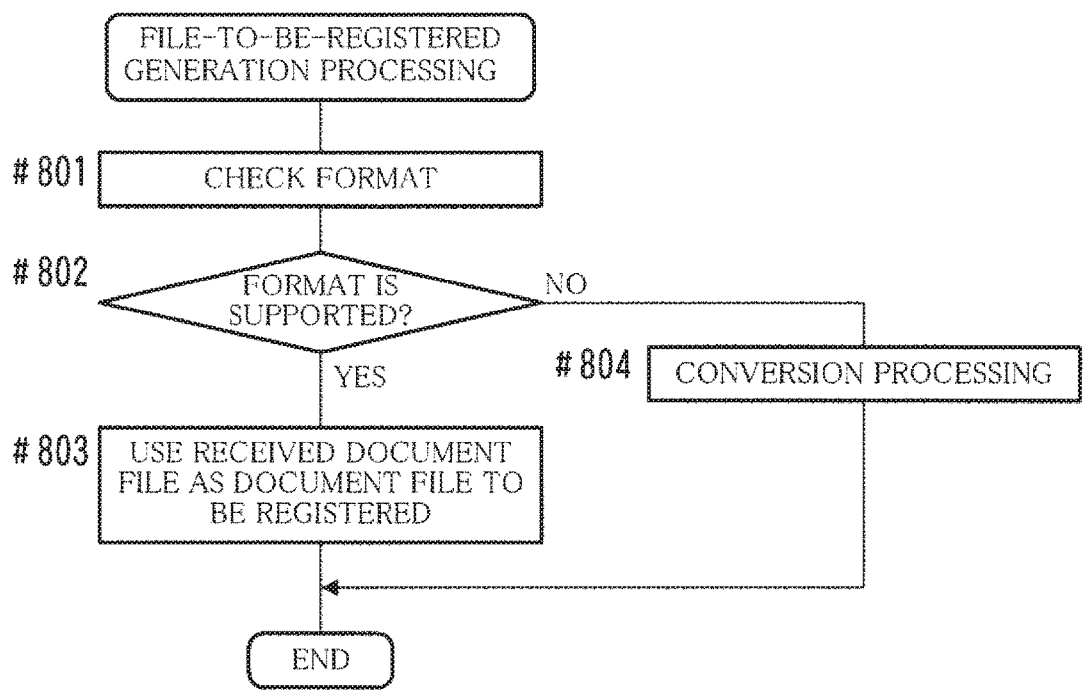
FIG. 12 is a flowchart depicting an example of the flow of file-to-be-registered generation processing.
Figure 14:
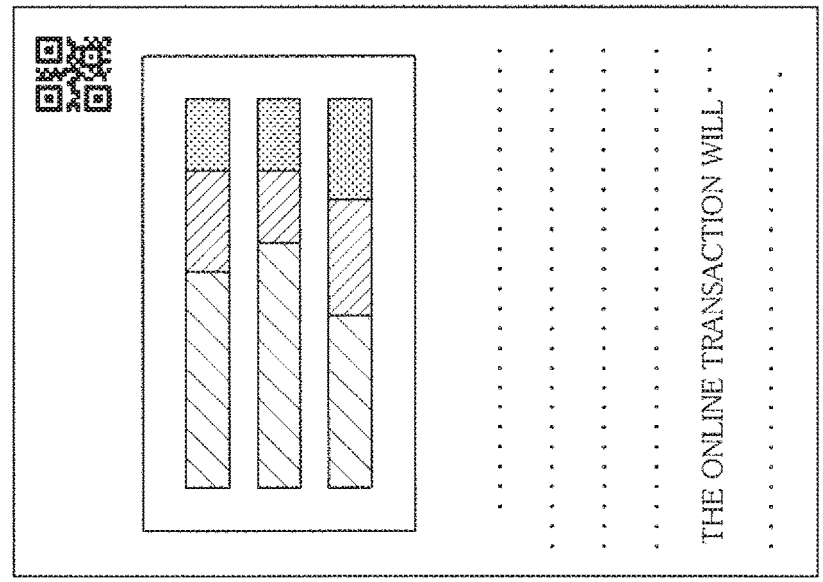
FIG. 14 is a diagram showing an example of a printed matter.
Figure 14:
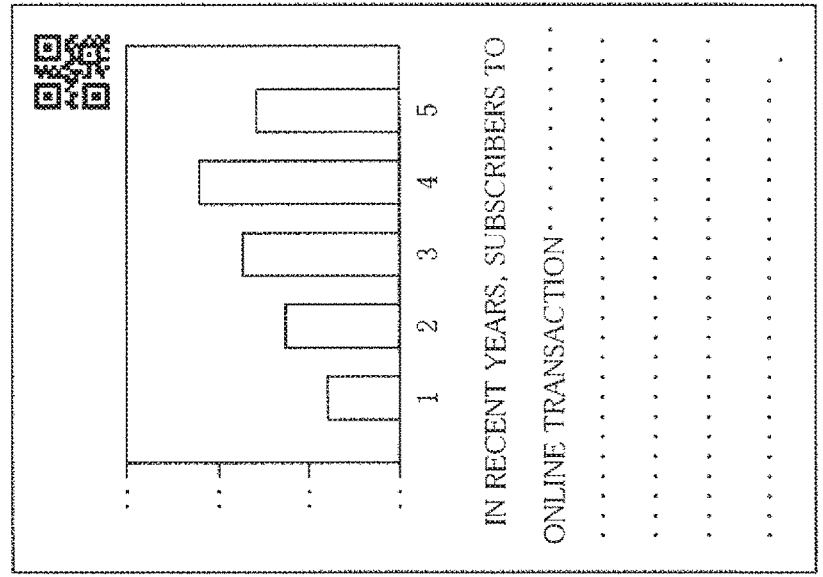
Figure 15A:
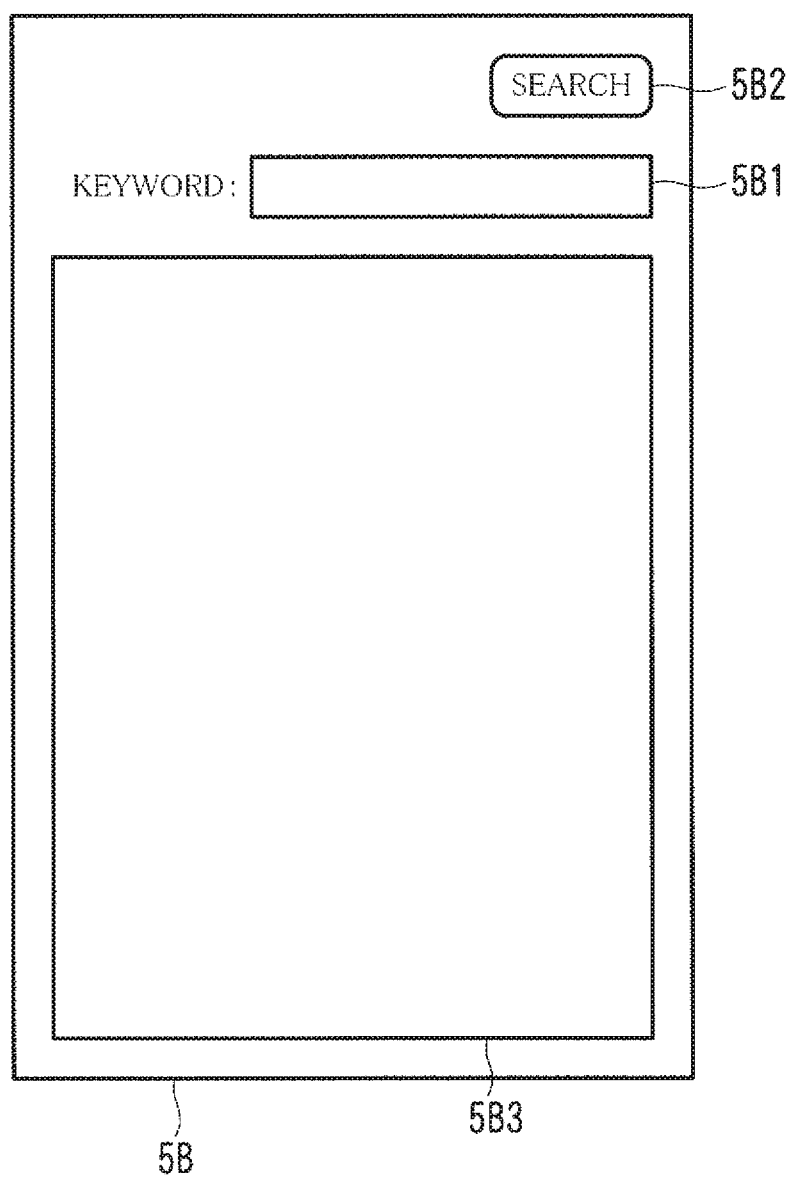
FIGS. 15A and 15B are diagrams showing an example of a search screen.
Figure 15B:
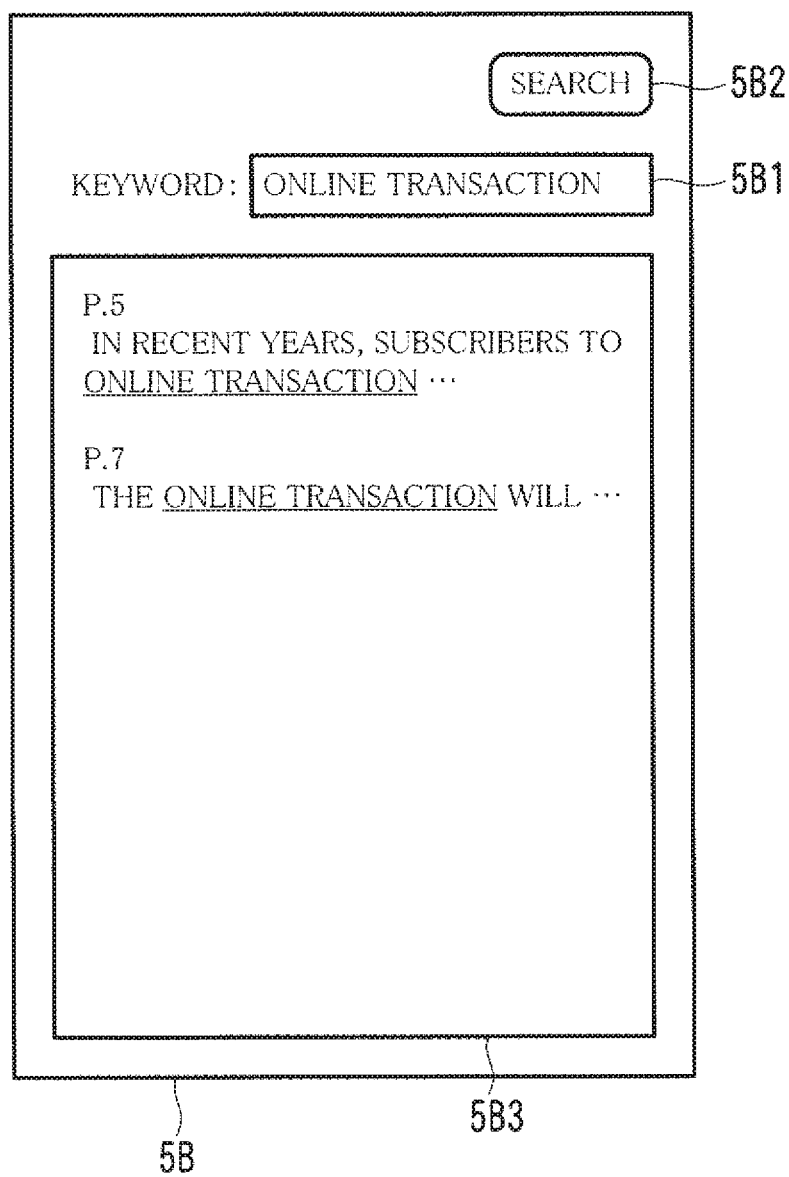
Figure 16:
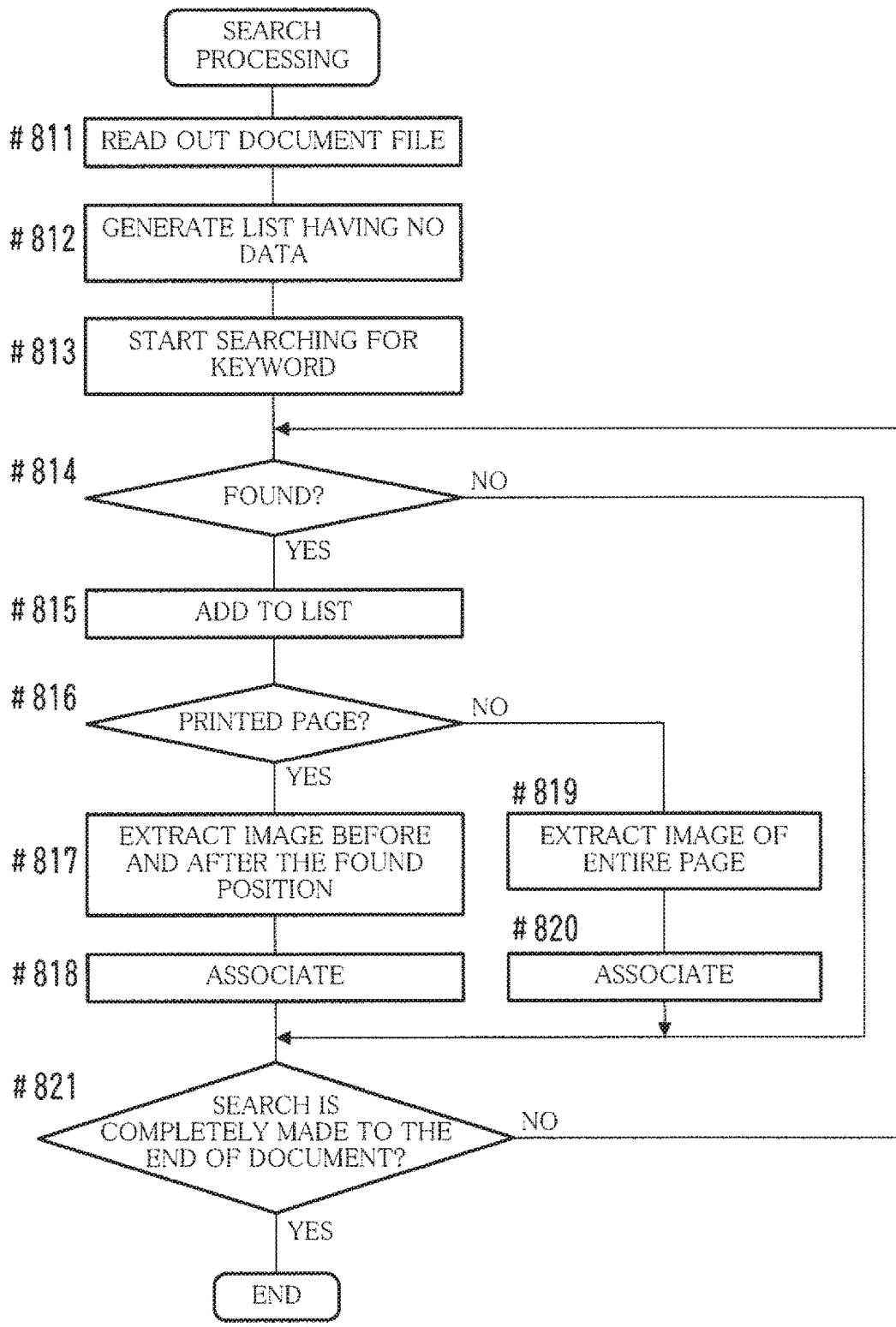
FIG. 16 is a flowchart, depicting an example of the flow of search processing.

FIG. 6 is a diagram showing an example of the functional configuration of the image forming apparatus 1 and the functional configuration of the terminal 30. FIG. 7 is a diagram showing an example of the functional configuration of the document server 2 and the functional configuration of the terminal 35. FIGS. 8 and 9 are sequence diagrams showing an example of the flow of processing by the image forming apparatus 1, the document server 2, the terminal 30, and the terminal 35. FIG. 10 is a diagram showing an example of a document 70. FIG. 11 is a diagram showing an example of a conditions receiving screen 5A. FIG. 12 is a flowchart depicting an example of the flow of file-to-be-registered generation processing. FIG. 13 is a diagram showing an example as to how a document file 65 is stored in a document file storage portion 203. FIG. 14 is a diagram showing an example of a printed matter 80. FIGS. 15A and 15B are diagrams showing an example of a search screen 5B. FIG. 16 is a flowchart depicting an example of the flow of search processing. FIGS. 17A and 17B are diagrams showing an example of the search screen 5B.

The description goes on to a mechanism for searching for a keyword from a printed document with reference to FIGS. 6-17.

The document file registration program 10P implements, in the image forming apparatus 1, the functions of a file-to-be-registered generation portion 101, a document identifier obtaining portion 102, an identifier image generating portion 103, a registration requesting portion 104, a job control portion 105, and so on, all of which are shown in FIG. 6.

The document management program 20P implements, in the document server 2, the functions of a document identifier issuing portion 201, a document file registration portion 202, a document file storage portion 203, a keyword search portion 204, a reference data generating portion 205, a result data transmission portion 206, and so on, all of which are shown in FIG. 7.

The printer driver 30P implements, in the terminal 30, the functions of a conditions reception processing portion 301, a print data generating portion 302, a network printing requesting portion 303, a document file transmission portion 304, and so on, all of which are shown in FIG. 6.

The search program 35P implements, in the terminal 35, the functions of a document identifier obtaining portion 351, a keyword receiving portion 352, a search requesting portion 353, a result screen displaying portion 354, and so on, all of which are shown in FIG. 7.

The individual portions of the image forming apparatus 1, the document server 2, the terminal 30, and the terminal 35 perform processing according to the steps shown in FIGS. 8 and 9.

The user prepares a document file, for example, by the following method. To be specific, he/she uses an application program installed in the terminal 30, e.g., spreadsheets software or word processing software to create a document, and saves the document as a file. Alternatively, he/she uses a web browser installed in the terminal 30 to download a document file from a web site. The document may include a chart, illustration and picture in addition to a character string. The document may have only one page or a plurality of pages.

Hereinafter, the case is described in which a file of the document 70 having 100 pages is prepared as shown in FIG. 10.

The user keeps the prepared file open with the application program, and enters a print command.

In response to the command entry, in the terminal 30, the conditions reception processing portion 301 performs processing for receiving printing conditions and a command to carry out printing in the following manner.

The conditions reception processing portion 301 displays the conditions receiving screen 5A as shown in FIG. 11 in the liquid crystal display 30*e* (Step #731 of FIG. 8).

The user then performs operation on the conditions receiving screen 5A in the following manner. He/she clicks a pull-down menu 5A1 to select the image forming apparatus 1 as a device to be used. If intending to print all of pages of the document 70, then he/she clicks a radio button 5A2. If intending to print only some pages of the document 70, then he/she clicks the radio button 5A3 and enters page numbers of the corresponding pages into a text box 5A4. Thereby, pages to be printed are selected.

When finishing selecting a device and pages to be printed, the user clicks an execute button 5A5.

In response to the execute button 5A5 clicked, the conditions reception processing portion 301 receives the details specified in the conditions receiving screen 5A (Step #732).

The print data generating portion 302 generates print data 61 to be used for printing the selected pages of the document (Step #733). The print data 61 is described in Page Description Language (PDL) supported in the device selected in the pull-down menu 5A1 (the image forming apparatus 1 in this embodiment).

When the print data 61 is generated, the network printing requesting portion 303 requests the device selected in the pull-down menu 5A1 (the image forming apparatus 1 in this embodiment) to execute a network printing job (Step #734). At this time, the print data 61 is sent to the device selected in the pull-down menu 5A1 (Step #735).

The document file transmission portion 304 sends, to the image forming apparatus 1, a file of the document 70 as a document file 62. Even if only some of the pages are selected as the pages to be printed, the document file transmission portion 304 sends all of the pages without omitting unselected pages. The document file transmission portion 304 also sends, together with the document file 62, page designation data 63 indicating the pages to be printed.

In the meantime, examples of a job which involves print processing by the printing unit 10*j* of the image forming apparatus 1 include a job of printing an image onto paper based on the print data 61 sent by the terminal 30 and a job of printing, onto paper, an image read out from the original document by the scanner unit 10*i*. Hereinafter, the former job is referred to as a "network printing job" and the latter job is referred to as a "copy job". In the copy job, a target document to be printed (duplicated) is referred to as a "document 71". The documents such as the document 70 (target document for the network printing job) and the document 71 are collectively called the "document 7" in some cases.

When the image forming apparatus 1 is given the request for network printing job or for copy job 5 (Step #701 or Step #703), the individual portions of the image forming apparatus 1 perform processing.

The file-to-be-registered generation portion 101 generates, if necessary, the document file 65 which is a file for search (Step #705). The steps for generating the document file 65 are shown in FIG. 12.

The file-to-be-registered generation portion 101 checks whether or not the format of data for printing the document 7 is supported in the document server 2 (Step #801 of FIG. 12).

To be specific, when receiving, from the terminal 30, a request for network printing job, the print data 61, the document file 62, and the page designation data 63 (Steps #701 and #702 of FIG. 8), the image forming apparatus 1 checks whether or not the format of the document file 62 is supported in the document server 2. On the other hand, when the user makes a request for copy job and when the scanner unit 10*i* reads out an image from the original document to generate bitmap data 64 (Steps #703 and #704), the file-to-be-registered generation portion 101 checks whether or not the format of the bitmap data 64 is supported in the document server 2.

If the format of the document file 62 or of the bitmap data 64 is supported in the document server 2 (YES in Step #802 of FIG. 12), then the file-to-be-registered generation portion 101 does not generate the document file 65. In such a case, the file-to-be-registered generation portion 101 determines that the document file 62 or the bitmap data 64 is used as-is as the document file 65 (Step #803).

In contrast, if the format of the document file 62 or of the bitmap data 64 is not supported in the document server 2 (NO in Step #802), then the file-to-be-registered generation portion 101 converts the document file 62 or the bitmap data 64 into a file of a format supported in the document server 2 (Step #804).

Suppose that, for example, the format of the document file 62 is the format of Microsoft word developed by Microsoft Corporation (so-called DOC format) and the format supported in the document server 2 is Portable Document Format (PDF) developed by Adobe Systems Incorporated. In such a case, the file-to-be-registered generation portion 101 generates the document file 65 by converting the document file 62 into a PDF file. The conversion is preferably made by known methods.

Alternatively, if the bitmap format is not supported in the document server 2, then the file-to-be-registered generation portion 101 converts the bitmap data 64 into a file of a format supported in the document server 2, for example, into a PDF file. A method for converting the bitmap data into a PDF file is known. The file-to-be-registered generation portion 101 then applies Optical Character Recognition (OCR) processing to the file. According to the processing, a character string (text) of letters or numerals contained in the document 71 are recognized. The character string is then embedded, as so-called transparent text, into the file. In this way, a PDF file with transparent text is obtained. The PDF file is used as the document file 65. The OCR technology and the technology to embed the transparent text are known. In the case of an original document having a plurality of pages, the file-to-be-registered generation portion 101 applies the OCR processing to each of the pages and embeds the transparent text in each of the pages.

When the format of data of each page of the document 70 is image data such as bitmap data, a PDF file with transparent text is preferably generated as the document file 65 by the OCR processing and embedding the transparent text.

Referring back to FIGS. 6, 7, 8, and 9, the document identifier obtaining portion 102 requests (Step #706) the document server 2 to issue a document identifier 7DS in parallel with the processing by the file-to-be-registered generation portion 101, or before or after the same, and obtains the document identifier 7DS from the document server 2 (Step #707). The document identifier 7DS is identification (ID) used for distinguishing the document 7 from other documents 7.

In the document server 2, when receiving the request from the image forming apparatus 1 (Step #720), the document identifier issuing portion 201 issues a unique ID as the document identifier 7DS (Step #721) to send the document identifier 7DS to the image forming apparatus 1 (Step #722).

In the image forming apparatus 1, the identifier image generating portion 103 generates an identifier image 7SG based on the document identifier 7DS obtained from the document server 2 (Step #708). The identifier image 7SG is an image of a predetermined standard into which a character string is converted. The character string has the document identifier 7DS and a page number (hereinafter, referred to as a "page number 7PB") of the document 7 which are combined through a predetermined mark (hyphen, for example). In the case where pages are to be printed, the identifier image generating portion 103 generates an identifier image 7SG for each of the pages.

For example, in the case where a request for network printing job of the document 70 is given to the image forming apparatus 1, where the document identifier 7DS of "S101" is issued for the document 70, and where the fifth page and the seventh page are print targets, then the identifier image generating portion 103 generates, as the identifier image 7SG, each of an image identified by "S101-5" and an image identified by "S101-7". The pages to be printed are shown in the page designation data 63.

Alternatively, in the case where a request for copy job is given to the image forming apparatus 1, where the document 71 has three pages, and where the document identifier 7DS of "S201" is issued for the document 70, then the identifier image generating portion 103 generates, as the identifier image 7SG, each of an image identified by "S201-1", an image identified by "S201-2", and an image identified by "S201-3".

The standard for the identifier image 7SG is a known standard. Hereinafter, an example is described in which the standard for QR code is used as the standard for the identifier image 7SG.

The registration requesting portion 104 requests the document server 2 to register the document file 65 generated by the file-to-be-registered generation portion 101 (Step #709).

At this time, the document file 65 is correlated with the character string contained in the identifier image 7SG generated by the identifier image generating portion 103, and the resultant is sent to the document server 2. When a plurality of the identifier images 7SG is generated, the document file 65 is correlated with a character string shown in each of the identifier images 7SG.

If the document file 65 is not generated by the file-to-be-registered generation portion 101 because the document file 62 conforms to the document server 2, then the registration requesting portion 104 sends the document file 62 to the document server 2 as the document file 65.

In the document server 2, when receiving the document file 65 (Step #723), the document file registration portion 202 stores, into the document file storage portion 203, the document file 65 with the correlation with the character string contained in the identifier image 7SG maintained (Step #724 of FIG. 9).

As a result, when the fifth page and the seventh page of the document 70 are the print targets, and when the document identifier 7DS of the document 70 is "S101", the document file registration portion 202 stores, into the document file storage portion 203, the document file 65 of the document 70 as shown in FIG. 13.

In the image forming apparatus 1, the job control portion 105 controls the printing unit 10j and so on in such a manner that a page image of the print target is printed onto paper together with the identifier image 7SG issued for the print target page by the identifier image generating portion 103 (Steps #710 and #711). It is desirable to print the identifier image 7SG in a margin on a page.

Consequently, the printed matter 80 of the print target page of the document 7 is generated. For example, in the case where the fifth page and the seventh page of the document 70 are the print targets, a printed matter as that shown in FIG. 14 is generated as the printed matter 80.

After obtaining the printed matter 80, the user can take a note on the printed matter 80 or read all or some pages of the document 7. The user can also search for a keyword from the document 7 with the terminal 35 and the document server 2.

The user causes the terminal 35 to launch the search program 35P. In the terminal 35, the document identifier obtaining portion 351 performs processing for obtaining the document identifier 7DS of the document to be searched in the following manner.

The document identifier obtaining portion 351 causes the touch-sensitive panel display 35e to display a message for prompting the user to photograph a QR code (Step #751).

The user focuses the digital camera 35i of the terminal 35 the identifier image 7SG to enter a command for photographing. In response to this operation, the digital camera 35i photographs the identifier image 7SG (Step #752).

The document identifier obtaining portion 351 converts the identifier image 7SG into a character string based on the QR code standard (Step #753). The character string contains the document identifier 7DS. The character string also contains a predetermined mark (hyphen, for example) and the page number 7PB.

The keyword receiving portion 352 performs processing for receiving a keyword for search in the following manner. The keyword receiving portion 352 displays the search screen 55 on the touch-sensitive panel display 35e as shown in FIGS. 15A and 155 (Step #754).

The user operates the touch-sensitive panel display 35e to enter a keyword in a text box 5B1 of the search screen 5B. Hereinafter, the keyword thus entered is referred to as a "keyword 7KY". The user taps on a search button 5B2. In response to the tap gesture, the keyword receiving portion 352 receives the keyword 7KY (Step #755).

When the document identifier obtaining portion 351 obtains the document identifier 7DS and the keyword receiving portion 352 receives the keyword 7KY, the search requesting portion 353 makes a request for search to the document server 2 (Step #756). At this time, the search requesting portion 353 sends search condition data 66 to the document server 2. The search condition data 66 indicates the keyword 7KY and the character string (the document identifier 7DS, the page number 7PB, and so on) obtained in Step #753.

With the document server 2, when receiving the search condition data 66 from the terminal 35 (Step #725), the keyword search portion 204 and the reference data generating portion 205 perform search processing and processing for generating data for displaying the search result, respectively (Step #726). The steps for the both processing are shown in FIG. 16.

The keyword search portion 204 reads out the document file 65 corresponding to the document identifier 7DS indicated in the search condition data 66 from the document file storage portion 203 (Step #811 of FIG. 16). The keyword search portion 204 then generates a search result list 67 having no data (Step #812). The keyword search portion 204 then starts searching for the keyword 7KY indicated in the search condition data 66 from the document 7 shown in the document file 65 (Step #813). The search result list 67 is described in language in which a hyperlink can be used, for example, in a Hypertext Markup Language (HTML).

If the keyword 7KY is found in the document 7 by the searching (YES in Step #814), then the keyword search portion 204 extracts, from the document 7, one or more words including the part found by the search and parts therearound, and writes, into the search result list 67, the extracted words and the number of the page containing the part found (Step #815).

The reference data generating portion 205 performs processing for displaying information related to the part found by the search in the following manner.

If the number of the page containing the part found is the same as the page number 7PB indicated in the search condition data 66 (YES in Step #816), then the reference data generating portion 205 extracts, from the document 7, an image of an area having a predetermined size (for example, size corresponding to approximately 20% of the entirety of the page) with the part found by the search set as the center or close thereto (Step #817). The reference data generating portion 205 then uses a hyperlink to associate the image with the part found (Step #818).

On the other hand, if the number of the page containing the part found by the search is different from the page number 7PB indicated in the search condition data 66 (NO in Step #816), then the reference data generating portion 205 extracts an image of the entire page from the document 7 (Step #819). The reference data generating portion 205 then uses a hyperlink to associate the image with the part found (Step #820).

The keyword search portion 204 performs the processing of Step #815, in order, from the top of the document 7. The reference data generating portion 205 performs the processing of Steps #816 through #820 every time the keyword is found by the search.

If the search is completely made to the end of the document 7 (YES in Step #821), then the keyword search portion 204 finishes the search processing.

Hereinafter, the image extracted in Step #817 or #819 is referred to as a "reference image 7RF".

Referring back to FIGS. 6, 7, 8, and 9, the result data transmission portion 206 sends, to the terminal 35, the search result list 67 obtained in Step #726 and image data of the reference image 7RF (Step #727).

In the terminal 35, the result screen displaying portion 354 updates the search screen 5B based on the search result list 67 and so on in such a manner that the search result is displayed in a search result area 5B3 (Steps #757 and #758).

For example, when the user photographs the identifier image 7SG on the fifth page of the document 70 and enters the keyword 7KY of "online transaction", the search result is displayed as shown in FIG. 15B.

As described above, each of the keywords KY is correlated with a hyperlink. In response to any of the keywords KY tapped on, the result screen displaying portion 354 updates the search screen 5B so as to replace the search result with the reference image 7RF to which the hyperlink corresponding to the tapped keyword 7KY links.

Consequently, since the identifier image 7SG of the fifth page is photographed in the foregoing example, if the keyword 7KY found out from the fifth page is tapped on, then an image having a predetermined size enough to surround the keyword 7KY is displayed as the reference image 7RF as shown in FIG. 17A. On the other hand, if the keyword 7KY found on the other pages (on the seventh page, for example) is tapped on, then an image of the entire page is displayed as the reference image 7RF as shown in FIG. 17B.

According to this embodiment, it is possible search for the keyword 7KY from the document 7 printed on paper more easily than is conventionally possible.

In this embodiment, in the case of a copy job or a network printing job, the document file 65 is registered in the document file registration portion 202 (see FIG. 13) of the document server 2 so that the keyword 7KY can be searched from the document 7. Further, also in the case of a job of receiving the document 7 via facsimile (so-called facsimile receiving job), the received data may be converted into the document file 65 and the resultant may be registered into the document server 2, so that the keyword 7KY may be searched.

In this embodiment, the keyword search portion 204 of the document server 2 searches for the keyword 7KY from all pages of the document 7. Instead of this, however, the keyword search portion 204 may search for the keyword 7KY from the page corresponding to the page number 7PB indicated in the search condition data 66.

Alternatively, the keyword search portion 204 may search for the keyword 7KY only from pages printed by the image forming apparatus 1. In such a case, the identifier image generating portion 103 of the image forming apparatus 1 generates the identifier image 7SG so as to contain the page numbers 7PB of all of the printed pages, and the job control portion 105 prints the identifier image 7SG on sheets of the corresponding pages. The search requesting portion 353 of the terminal 35 generates the search condition data 66 so as to indicate all of the page numbers 7PB contained in the photographed identifier image 7SG, and sends the search condition data 66 to the document server 2. Then, the keyword search portion 204 of the document server 2 searches for the keyword 7KY from all pages of which the page numbers 7PB are indicated in the search condition data 66.

When the keyword 7KY is found in a page of the printed document by the search, independently of which page of the document the document identifier 7DS is photographed in, the reference data generating portion 205 of the document server 2 may extract, as the reference image 7RF, an image of an area having a predetermined size with the part found by the search set as the center or close thereto. Instead, when the keyword 7KY is found, by the search, in a page of the document which is not printed on paper, the reference data generating portion 205 extracts, as the reference image 7RF, the image of the entire page. The individual portions of all the devices perform processing to inform the document server 2 of the page of the printed document in the following manner. The identifier image generating portion 103 of the image forming apparatus 1 generates an identifier image 7SG so as to contain the page numbers 7PB of all the printed pages. The job control portion 105 prints the identifier image 7SG onto sheets corresponding to all the pages. The search requesting portion 353 of the terminal 35 generates search condition data 66 in a manner to show all the page numbers 7PB contained in the photographed identifier image 7SG and sends the search condition data 66 to the document server 2.

In this embodiment, the identifier image 7SG contains the page number 7PB of a page onto which the identifier image 7SG is printed. In the case of the document 7 having only one page, the identifier image 7SG may not contain the page number 7PB of that page. In such a case, the document file 65 is correlated only with the document identifier 7DS, and the resultant is stored into the document file registration portion 202 of the document server 2. Further, the page number 7PB is not shown in the search condition data 66, either. When the page number 7PB is not shown in the search condition data 66, the keyword search portion 204 of the document server 2 preferably extracts the document file 65 correlated only with the document identifier 7DS to conduct a search.

In this embodiment, only for the case of network printing, the user is allowed to select a page to be printed among pages of the document 7. The embodiment is not limited to this case. Another arrangement is also possible in which, for the case of a copy job, a selection screen is displayed on the touch-sensitive panel display 10e and the user selects a page to be printed. At this time, the scanner unit 10i scans all the pages of the document 7. As with the case of a network printing job, the identifier image generating portion 103 generates an identifier image 7SG only for the selected page. The job control portion 105 controls the printing unit 10j so that only the selected page is printed onto paper together with the identifier image 75G corresponding to the selected page.

In this embodiment, the image forming apparatus 1 sends the document file 65 to the document server 2. The document server 2 then searches for a keyword 7KY and generates a reference image 7RF. Instead of this, however, the image forming apparatus 1 may send the document file 65 to the terminal 35. The terminal 35 then may search for a keyword 7KY and generate a reference image 7RF instead of the document server 2.

In this embodiment, processing for generating the document file 65 from the bitmap data 64 or the document file 62 (conversion processing to a format corresponding to the document server 2) is performed by the image forming apparatus 1. Instead of this, however, the processing may be performed by the document server 2. Alternatively, the processing for generating the document file 65 from the document file 62 may be performed by the terminal 30.

The image forming apparatus 1 may be configured to have the functions of the document server 2. In the case where, for example, the image forming apparatus 1 is provided with an Internal Web Server (IWS), then the document management program 20P is executed in the IWS, so that the functions of the document identifier issuing portion 201 through the result data transmission portion 206 (see FIG. 7) are implemented in the image forming apparatus 1, and that the processing may be performed in accordance with the steps shown in FIGS. 8 and 9. Alternatively, the processing of Steps #701 through #711 and the processing of Steps #720 through #727 shown in FIGS. 8 and 9 may be executed by one program. In such a case, communication between the image forming apparatus 1 and the document server 2 (Steps #706, #707, #720, and #722) may be omitted.

Further, the image forming apparatus 1 may be provided with the functions of the terminal 35 shown in FIG. 7, namely, the functions of the document identifier obtaining portion 351, the keyword receiving portion 352, the search requesting portion 353, and the result screen displaying portion 354. In such a case, the interaction between the document server 2 and the terminal 35 (Steps #725, #727, #756, and #757) may be omitted. The scanner unit 10*i* may be used instead of the digital camera 35*i*. Alternatively, the image forming apparatus 1 may be provided with a digital camera which is used instead of the digital camera 35*i*. In place of the touch-sensitive panel display 35*e*, the touch-sensitive panel display 10*e* is used.

In this embodiment, a QR code is used as the identifier image 7SG. Instead, an image of a different standard may be used as the identifier image 7SG.

It is to be understood that the configurations of the document management system 100, the image forming apparatus 1, the document server 2, the terminal 30, and the terminal 35, the constituent elements thereof, the content and order of the processing, the configuration of databases, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A retrieval system comprising:
   a printer;
   at least one processor which is configured to (i) receive an instruction for printing a document, (ii) obtain, in response to receipt of the instruction, a searchable document file of the document to be printed, (iii) generate, in response to receipt of the instruction, an identifier image representing an identifier of the document, and (iv) control, in response to receipt of the instruction, the printer to print the document onto paper together with the identifier image;
   a storage configured to correlate electronic data of the searchable document file with the identifier and to store the electronic data of the searchable document file in correlation with the identifier;
   an image taking device configured to photograph the identifier image printed on the paper;
   an input device configured to receive an input of a keyword;
   wherein the at least one processor is configured to retrieve, when the image taking device photographs the identifier image, the electronic data of the searchable document file which is correlated with the identifier represented by the photographed identifier image, and to search for the input keyword in the document by using the retrieved electronic data of the searchable document file;
   wherein the retrieval system further comprises a display device configured to display a result of the search,
   wherein the document has a plurality of pages, and the printer prints any of the pages, and
   wherein the at least one processor generates, as the identifier image, an image representing the identifier of the document and further representing page identifiers of all of the pages of the document which are to be printed in accordance with the received instruction for printing the document.

2. The retrieval system according to claim 1, wherein the at least one processor searches for the keyword in all of the pages of the document.

3. The retrieval system according to claim 2, wherein:
   the at least one processor is further configured to extract reference information from said any of the pages, the reference information corresponding to the keyword and a part immediately before or immediately after the keyword, or, alternatively, the reference information corresponding to an entirety of said any of the pages;
   wherein:
   the printer prints said any of the pages together with the identifier image,
   when the keyword is found in a page, of the pages, corresponding to a page identifier represented in the identifier image photographed, the at least one processor extracts, as the reference information, the keyword and the part immediately before or immediately after the keyword,
   when the keyword is found in a page other than a page corresponding to a page identifier represented in the identifier image photographed, the at least one processor extracts an entirety of the page as the reference information, and
   the display device further displays the reference information.

4. The retrieval system according to claim 2, wherein the at least one processor is further configured to, when the keyword is found in a printed page of the pages, extract, as reference information, information on the keyword and a part immediately before or immediately after the keyword, and configured to, when the keyword is found in a non-printed page of the pages, extract an entirety of the non-printed page as the reference information; and
   wherein the display device further displays the reference information.

5. The retrieval system according to claim 1, wherein:
   the printer prints some of the pages, and
   the at least one processor searches for the keyword in said some of the pages.

6. The retrieval system according to claim 2, wherein the printer prints a page selected by a user among the pages.

7. The retrieval system according to claim 2, wherein:
   the at least one processor is further configured to read out all of the pages;
   the printer prints, for a copy job, a page selected by a user from among the read-out pages; and
   the storage stores, as the electronic data, data on the read-out pages or data obtained by applying processing to the data on the read-out pages.

8. The retrieval system according to claim 2, wherein:
   the at least one processor is further configured to extract reference information from said any of the pages, the reference information corresponding to the keyword and a part immediately before or immediately after the keyword, or, alternatively, the reference information corresponding to an entirety of said any of the pages;

the printer prints a page selected by a user from among the pages together with the identifier image, when the keyword is found in a page, of the pages, corresponding to a page identifier represented in the identifier image photographed, the at least one processor extracts, as the reference information, the keyword and the part immediately before or immediately after the keyword, when the keyword is found in a page other than a page corresponding to a page identifier represented in the identifier image photographed, the at least one processor extracts an entirety of the page as the reference information, and the display device further displays the reference information.

9. The retrieval system according to claim 1, wherein:
the printer is provided in an image forming apparatus,
the storage is provided in a server configured to perform communication with the image forming apparatus,
the at least one processor comprises a processor which is provided in the server and which is configured to perform at least said retrieving of the electronic data of the searchable document file and said searching for the input keyword in the document by using the retrieved electronic data of the searchable document file, and
the image taking device, the input device, and the display device are provided in a terminal configured to perform communication with the server.

10. A retrieval method for a retrieval system comprising a printer, a storage, an image taking device, an input device, a display device, and at least one processor, the method comprising:
with the at least one processor:
receiving, with the at least one processor, an instruction for printing a document,
obtaining, in response to receipt of the instruction, a searchable document file of the document to be printed,
generating, in response to receipt of the instruction, an identifier image representing an identifier of the document, and
controlling, in response to receipt of the instruction, the printer to print the document onto paper together with the identifier image;
correlating electronic data of the searchable document file with the identifier and storing the electronic data of the searchable document file in correlation with the identifier into the storage;
photographing, with the image taking device, the identifier image printed on the paper;
receiving, via the input device, an input of a keyword;
with the at least one processor:
retrieving, when the identifier image is photographed, the electronic data of the searchable document file which is correlated with the identifier represented by the photographed identifier image, and searching for the input keyword in the document by using the retrieved electronic data of the searchable document file; and
displaying, with the display device, a result of the search,
wherein the document has a plurality of pages, and the printer prints any of the pages, and wherein the method further comprises, with the at least one processor, generating, as the identifier image, an image representing the identifier of the document and further representing page identifiers of all of the pages of the document which are to be printed in accordance with the received instruction for printing the document.

11. The retrieval method according to claim 10, wherein:
the keyword is searched for in all of the pages; and
the method further comprises:
extracting, with the at least one processor, reference information from said any of the pages, the reference information corresponding to the keyword and a part immediately before or immediately after the keyword, or, alternatively, the reference information corresponding to an entirety of said any of the pages;
printing, with the printer, said any of the pages together with, as the identifier image, an image representing the identifier and a page identifier of the page,
when the keyword is found in a page, of the pages, corresponding to a page identifier represented in the identifier image photographed, extracting, with the at least one processor, as the reference information, the keyword and the part immediately before or immediately after the keyword,
when the keyword is found in a page other than a page corresponding to a page identifier represented in the identifier image photographed, extracting, with the at least one processor, an entirety of the page as the reference information, and
displaying, with the display device, the reference information.

12. A retrieval system comprising:
a printer configured to print a document onto paper together with an identifier image, the identifier image representing an identifier of the document;
a storage configured to correlate electronic data for the document with the identifier to store the electronic data;
an image taking device configured to photograph the identifier image printed on the paper;
an input device configured to receive an input of a keyword;
at least one processor configured to search for the input keyword in the document by using the electronic data corresponding to the identifier represented in the identifier image photographed; and
a display device configured to display a result of the search;
wherein the document has a plurality of pages, the printer prints any of the pages, and the at least one processor searches for the keyword in all of the pages;
wherein the at least one processor is further configured to, when the keyword is found in a printed page of the pages, extract, as reference information, information on the keyword and a part immediately before or immediately after the keyword, and configured to, when the keyword is found in a non-printed page of the pages, extract an entirety of the non-printed page as the reference information; and
wherein the display device further displays the reference information.

13. A retrieval method for retrieval system comprising a printer, a storage, an image taking device, an input device, a display device, and at least one processor, the method comprising:
printing, with the printer, a document onto paper together with an identifier image, the identifier image representing an identifier of the document;

correlating electronic data for the document with the identifier to store the electronic data in the storage;

photographing, with the image taking device, the identifier image printed on the paper;

receiving, via the input device, an input of a keyword;

searching, with the at least one processor, for the input keyword in the document by using the electronic data corresponding to the identifier represented in the identifier image photographed; and displaying, with the display device, a result of the search;

wherein the document has a plurality of pages, the printer prints any of the pages, and the keyword is searched for in all of the pages;

wherein the method further comprises:

when the keyword is found in a printed page of the pages, extracting, as reference information, with the at least one processor, information on the keyword and a part immediately before or immediately after the keyword, and when the keyword is found in a non-printed page of the pages, extracting, with the at least one processor, an entirety of the non-printed page as the reference information; and displaying, with the display device, the reference information.

14. A retrieval system comprising:

a printer configured to print a document onto paper together with an identifier image, the identifier image representing an identifier of the document;

a storage configured to correlate electronic data for the document with the identifier to store the electronic data;

an image taking device configured to photograph the identifier image printed on the paper;

an input device configured to receive an input of a keyword;

at least one processor configured to search for the input keyword in the document by using the electronic data corresponding to the identifier represented in the identifier image photographed; and a display device configured to display a result of the search;

wherein:

the document has a plurality of pages, the printer prints any of the pages, and the at least one processor searches for the keyword in all of the pages;

the at least one processor is further configured to extract reference information from said any of the pages, the reference information corresponding to the keyword and a part immediately before or immediately after the keyword, or, alternatively, the reference information corresponding to an entirety of said any of the pages;

the printer prints a page selected by a user from among the pages together with, as the identifier image, an image representing the identifier and a page identifier of the page selected, when the keyword is found in a page, of the pages, corresponding to the page identifier represented in the identifier image photographed, the at least one processor extracts, as the reference information, the keyword and the part immediately before or immediately after the keyword, when the keyword is found in a page other than the page corresponding to the page identifier represented in the identifier image photographed, the at least one processor extracts an entirety of the page as the reference information, and the display device further displays the reference information.

15. A retrieval method for retrieval system comprising a printer, a storage, an image taking device, an input device, a display device, and at least one processor, the method comprising:

printing, with the printer, a document onto paper together with an identifier image, the identifier image representing an identifier of the document;

correlating electronic data for the document with the identifier to store the electronic data in the storage;

photographing, with the image taking device, the identifier image printed on the paper;

receiving, via the input device, an input of a keyword;

searching, with the at least one processor, for the input keyword in the document by using the electronic data corresponding to the identifier represented in the identifier image photographed; and displaying, with the display device, a result of the search;

wherein the document has a plurality of pages, the printer prints any of the pages, and the keyword is searched for in all of the pages;

wherein the method further comprises:

extract, with the at least one processor, reference information from said any of the pages, the reference information corresponding to the keyword and a part immediately before or immediately after the keyword, or, alternatively, the reference information corresponding to an entirety of said any of the pages;

printing, with the printer, a page selected by a user from among the pages together with, as the identifier image, an image representing the identifier and a page identifier of the page selected, when the keyword is found in a page, of the pages, corresponding to the page identifier represented in the identifier image photographed, extracting, with the at least one processor, as the reference information, the keyword and the part immediately before or immediately after the keyword, when the keyword is found in a page other than the page corresponding to the page identifier represented in the identifier image photographed, extracting, with the at least one processor, an entirety of the page as the reference information, and displaying, with the display device, the reference information.

* * * * *